United States Patent
Folie

(10) Patent No.: US 9,506,283 B2
(45) Date of Patent: Nov. 29, 2016

(54) ACTUATOR FOR A FURNITURE FLAP

(71) Applicant: Julius Blum GmbH, Hoechst (AT)

(72) Inventor: Andreas Folie, Dornbirn (AT)

(73) Assignee: Julius Blum GmbH, Hoechst (AT)

( * ) Notice: Subject to any disclaimer, the term of this patent is extended or adjusted under 35 U.S.C. 154(b) by 0 days.

(21) Appl. No.: 14/833,482

(22) Filed: Aug. 24, 2015

(65) Prior Publication Data
US 2015/0361705 A1  Dec. 17, 2015

Related U.S. Application Data

(63) Continuation of application No. PCT/AT2014/000036, filed on Feb. 21, 2014.

(30) Foreign Application Priority Data

Mar. 4, 2013 (AT) .................. A 165/2013

(51) Int. Cl.
| | |
|---|---|
| *A47B 95/02* | (2006.01) |
| *E05F 1/10* | (2006.01) |
| *E02D 5/80* | (2006.01) |
| *A47B 96/00* | (2006.01) |
| *F03G 1/10* | (2006.01) |

(52) U.S. Cl.
CPC ............ *E05F 1/105* (2013.01); *A47B 96/00* (2013.01); *E02D 5/80* (2013.01); *F03G 1/10* (2013.01); *E05Y 2900/20* (2013.01); *Y10T 74/18888* (2015.01)

(58) Field of Classification Search
CPC ............ E05F 1/105; E02D 5/80; F03G 1/10; A47B 96/00
See application file for complete search history.

(56) References Cited

U.S. PATENT DOCUMENTS

| | | | | |
|---|---|---|---|---|
| 1,007,523 A | * | 10/1911 | Brucker | ............... E05F 3/104 16/281 |
| 3,555,590 A | | 1/1971 | Halopoff | |
| 3,999,245 A | | 12/1976 | Bue et al. | |
| 5,685,510 A | * | 11/1997 | Frankish | ............... A47B 9/04 108/147 |

(Continued)

FOREIGN PATENT DOCUMENTS

| | | |
|---|---|---|
| AT | 510 984 | 8/2012 |
| CN | 101977533 | 2/2011 |

(Continued)

OTHER PUBLICATIONS

International Search Report issued Sep. 5, 2014 in corresponding International Application No. PCT/AT2014/000036 (with English translation).
Austrian Search Report issued Nov. 5, 2013 in corresponding Austrian Patent No. A 165/2013 (with English translation).

(Continued)

*Primary Examiner* — Hanh V Tran
(74) *Attorney, Agent, or Firm* — Wenderoth, Lind & Ponack, L.L.P.

(57) ABSTRACT

An actuator, for moving a flap of a furniture item, has a pivotally mounted actuating arm for moving the flap, a spring device for acting on the actuating arm and having a pivoting moment in an opening direction, an adjustment device for adjusting the actuator, wherein the adjustment device comprises a gear mechanism having a first pinion and a crown gear, the crown gear axis of which forms an angle, preferably a right angle, with the pinion axis, wherein the gear mechanism comprises a second pinion, which engages with the same crown gear as the first pinion.

20 Claims, 12 Drawing Sheets

(56) References Cited

U.S. PATENT DOCUMENTS

| | | | | |
|---|---|---|---|---|
| 7,240,974 | B2* | 7/2007 | Hirtsiefer | E05D 15/262 312/109 |
| 2001/0039762 | A1* | 11/2001 | Giovannetti | E05F 1/1091 49/246 |
| 2007/0124893 | A1* | 6/2007 | Brustle | E05F 1/1075 16/296 |
| 2010/0162847 | A1* | 7/2010 | Gassner | E05F 1/1058 74/490.07 |
| 2010/0314981 | A1 | 12/2010 | Koenig et al. | |
| 2011/0067511 | A1* | 3/2011 | Pettersson | F16H 25/2015 74/89.28 |
| 2011/0193458 | A1* | 8/2011 | Omann | E05D 15/401 312/319.2 |
| 2012/0181909 | A1 | 7/2012 | Isele et al. | |
| 2013/0333291 | A1* | 12/2013 | Blum | E05F 1/1058 49/386 |

FOREIGN PATENT DOCUMENTS

| | | |
|---|---|---|
| CN | 201826655 | 5/2011 |
| CN | 102762811 | 10/2012 |
| DE | 100 31 403 | 1/2002 |
| EP | 1 154 109 | 11/2001 |
| JP | 61-206072 | 12/1986 |
| JP | 2007-169876 | 7/2007 |
| SU | 733522 | 5/1980 |
| WO | 2006/005086 | 1/2006 |
| WO | 2012/112997 | 8/2012 |

OTHER PUBLICATIONS

Search Report issued May 5, 2016 in corresponding Chinese Application No. 201480011681.X.

Japanese Office Action issued Sep. 30, 2016 in corresponding Japanese Patent Application No. 2015-560484.

* cited by examiner

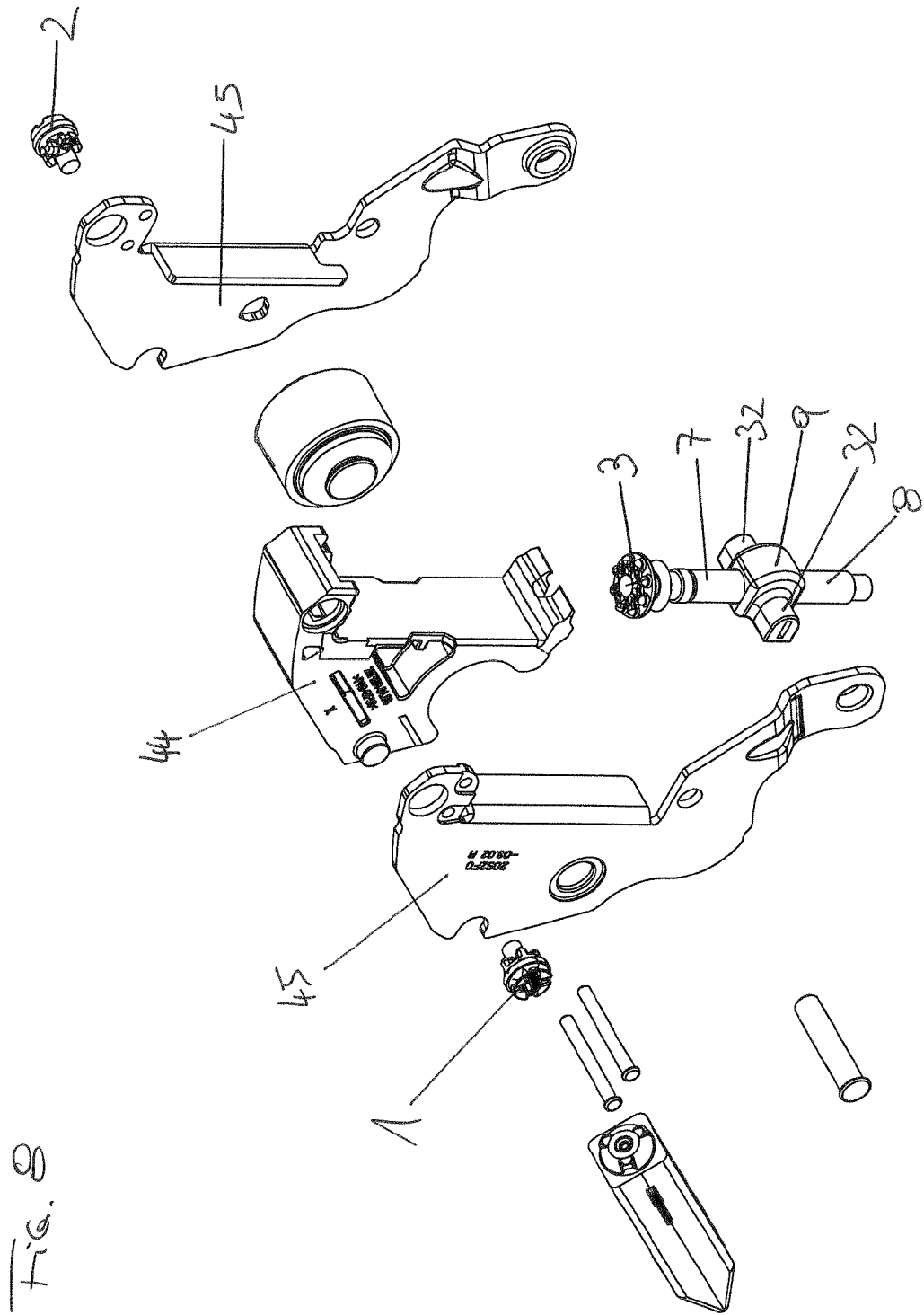

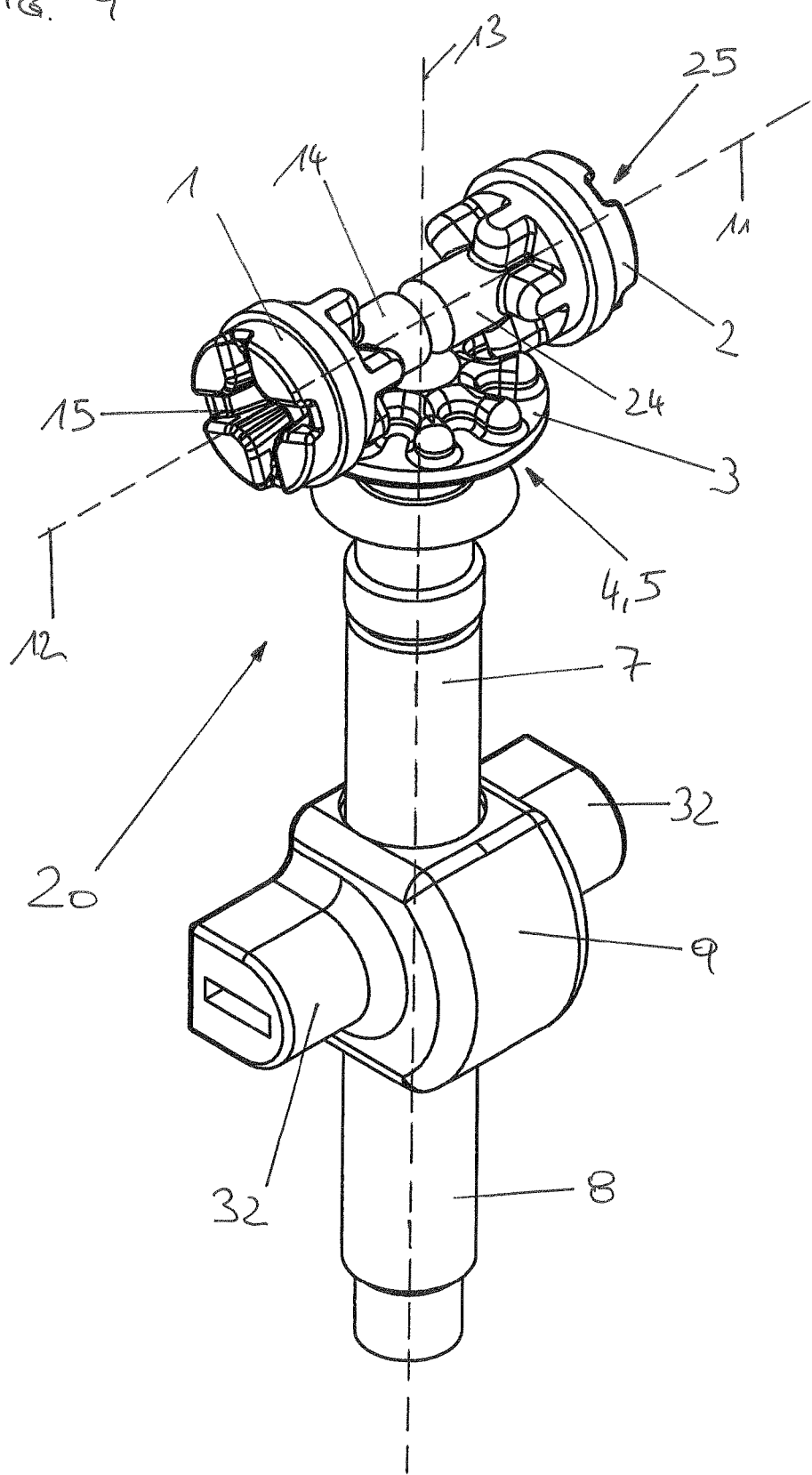

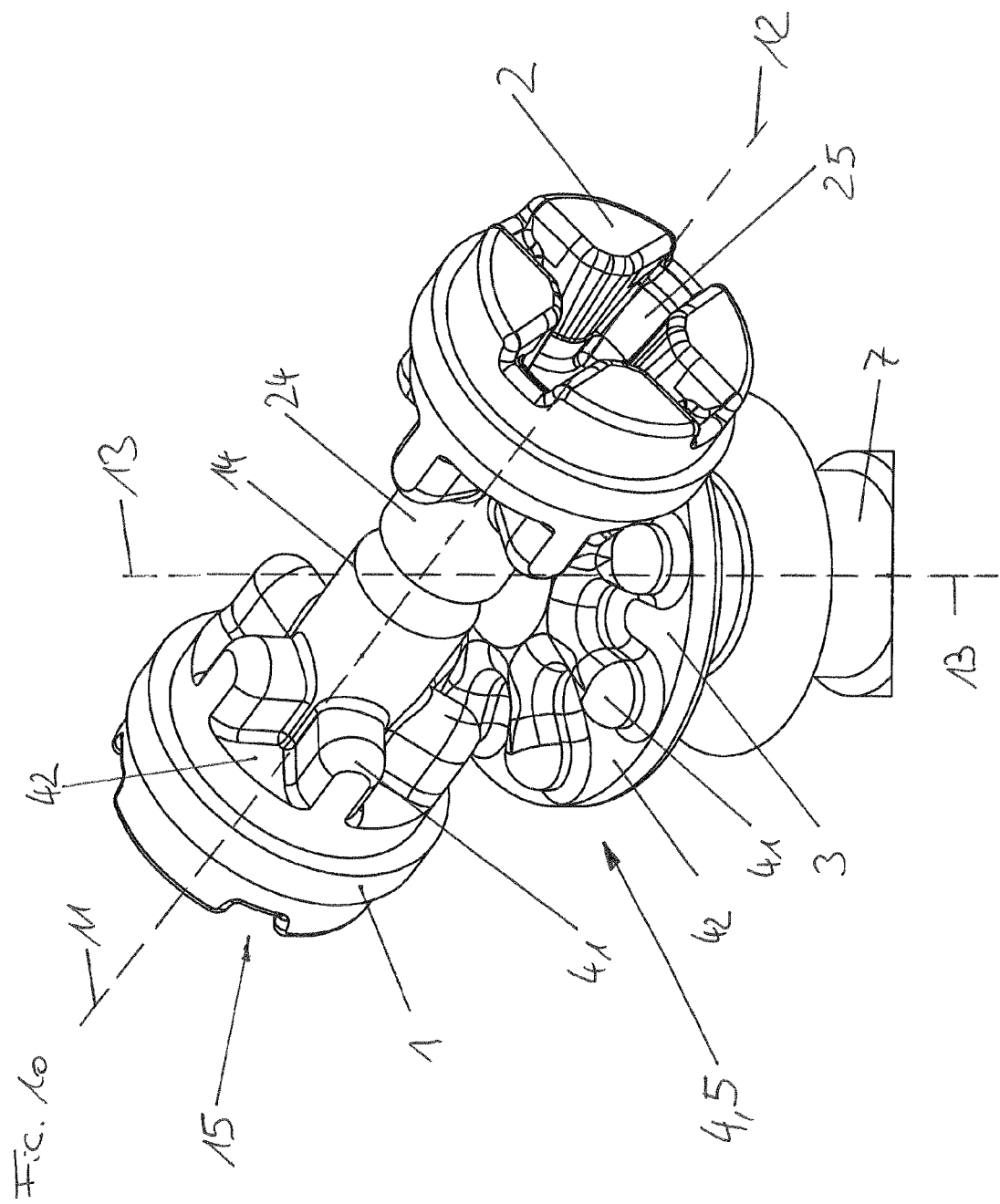

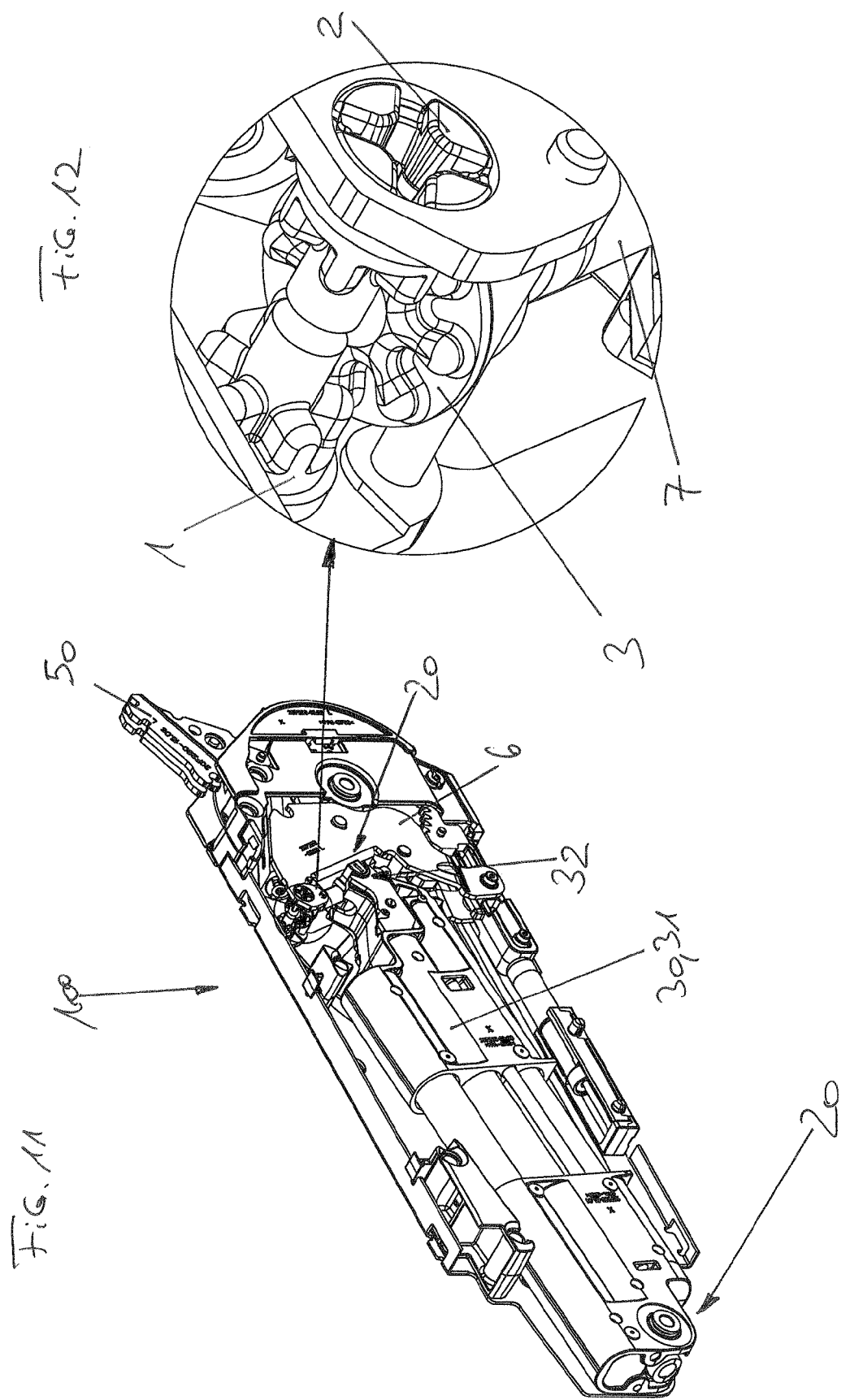

ACTUATOR FOR A FURNITURE FLAP

BACKGROUND OF THE INVENTION

1. Field of the Invention

The present invention concerns an actuator drive for moving a flap of an article of furniture having the features of a classifying portion and an article of furniture comprising a flap and two such actuator drives.

2. Description of Related Art

An actuator drive of the general kind set forth for moving a flap of an article of furniture is known, for example, from WO 2012/112997, or WO 2006/005086 which discloses a similar such actuator drive.

As such actuator drives are fixed to flaps, which are of different sizes and thus of different weights, in order to pivot them, it is necessary for the actuator drives to be capable of adjustment both with respect to their pivoting force and also with respect to the torque to be transmitted. For that purpose, those actuator drives always have, on the one hand, a spring device for urging the actuator arm with a pivotal moment in the opening direction, wherein the spring packs of the spring device can be adjusted with respect to their force by way of an adjusting device, and, on the other hand, the actuator drives have an adjusting device in order to adjust the operative pivotal moment of the spring device acting on the actuator arm of the actuator drive.

In the state of the art, adjustment of those adjusting devices is often found to be quite problematic because those actuator drives are fixed both to left sides of the furniture carcass and also to right sides of the furniture carcass and therefore adjustment of the actuator drives at a right-hand side wall of the furniture carcass takes place differently from adjustment of the actuator drive at a left-hand side wall of the furniture carcass.

SUMMARY OF THE INVENTION

The object of the invention is to provide a more convenient actuator drive for moving a flap of an article of furniture, which is adjustable to different flaps in an easier fashion for the assembly workers.

That object is attained by an actuator drive having the features described below and an article of furniture having the features described below.

Further advantageous embodiments of the invention are defined in the appendant claims.

The fact that the gear transmission of the adjusting device has a second pinion which is in engagement with the same crown gear as the first pinion makes it possible for a specific pinion to be available for adjustment for fitting the actuator drive at the left-hand side wall of the furniture carcass and also a specific pinion to be available for fitting at the right-hand side wall of the furniture carcass. Thus, the person performing the adjustment of the actuator drive can conveniently perform adjustment with a specific pinion dedicated for each side wall of the furniture carcass.

Protection is also claimed for an article of furniture comprising a furniture flap and two actuator drives in accordance with at least one of the described embodiments.

BRIEF DESCRIPTION OF THE DRAWINGS

Further details and advantages of the present invention will be described more fully hereinafter by means of the specific description with reference to the embodiments, by way of example, illustrated in the drawings, in which:

FIG. 8 shows an exploded perspective view of the actuator lever with an adjusting device, FIG. 9 shows a perspective view of the adjusting device, FIG. 10 shows a perspective view of the bevel gear transmission, FIG. 11 shows a perspective view of a variant of an actuator drive, FIG. 12 shows a perspective detail of FIG. 11 with an adjusting device for adjusting the position of the engagement point of a spring pack on the actuator lever.

DETAILED DESCRIPTION OF THE INVENTION

Figure 1:
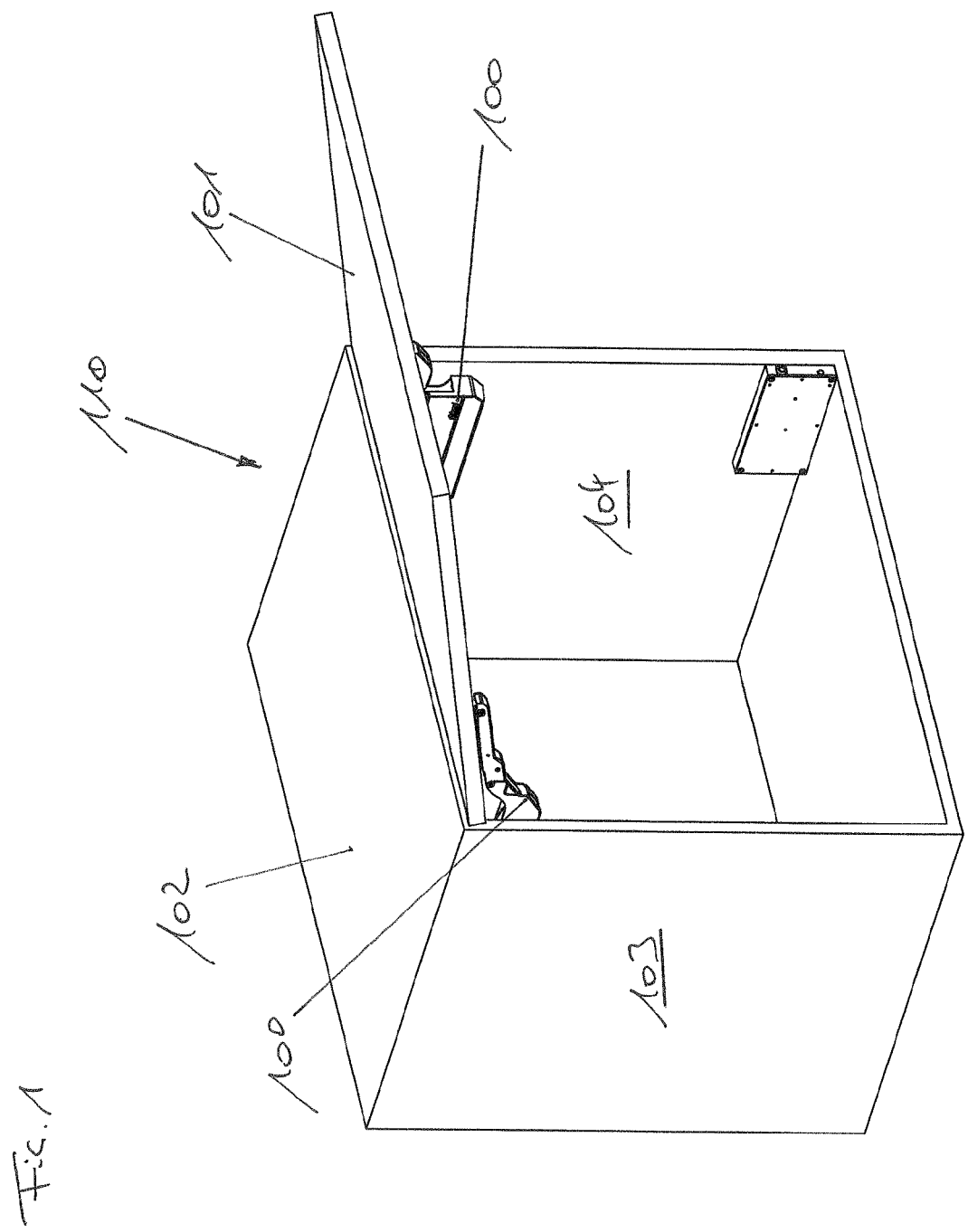
FIG. 1 shows a perspective view of an article of furniture with two actuator drives on a furniture flap.

FIG. 1 shows a perspective view of an article of furniture 110 having a furniture carcass 102 and a furniture flap 101. To pivot the furniture flap 101, two actuator drives 100 are mounted in the furniture carcass 102 at the side walls 103 and 104 thereof, with the furniture flap 101 being fixed to the actuator drives 100.

Figure 2:
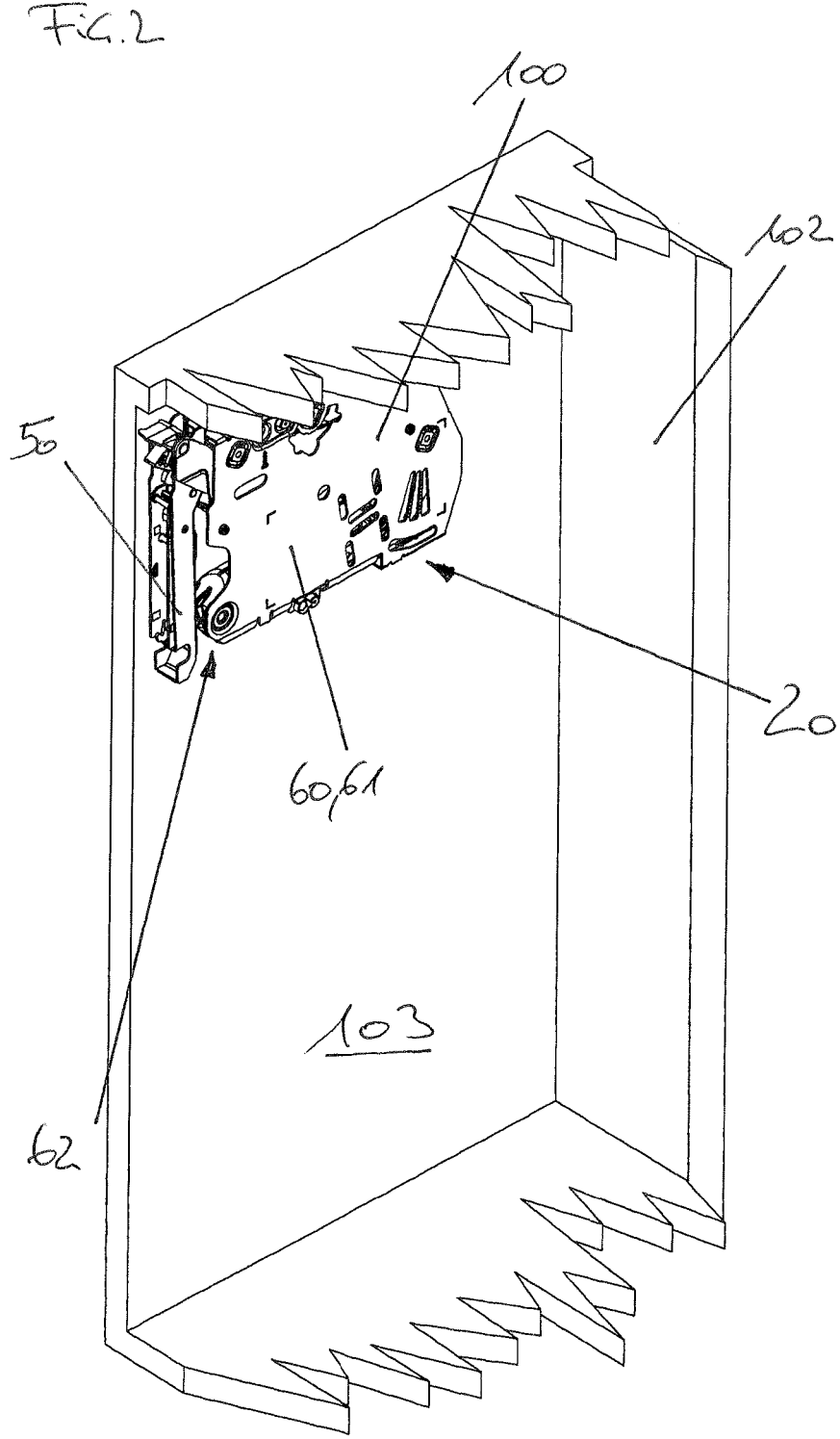
FIG. 2 shows a cutaway perspective view of an article of furniture with an actuator drive.

FIG. 2 shows a cutaway view of the furniture carcass 102 with a view directed to the left-hand side wall 103 thereof. The actuator drive 100 is fixed to the left side wall 103 in the upper region thereof. In this case, the actuator drive 100 has a housing 60 which has a left-hand housing side 61 and a right-hand housing side 62. The two housing sides 61 and 62 are substantially flat so that they can bear well against the side wall of the furniture carcass. The adjusting device 20 is accessible from the left-hand housing side 61 when the actuator drive 100 is fixed to a left-hand side wall 103.

If the actuator drive 100 is fixed to a right-hand carcass side wall 104 (not shown), the adjusting device 20 is accessible from the right-hand housing side 62 of the housing 60 of the actuator drive 100.

Figure 3:
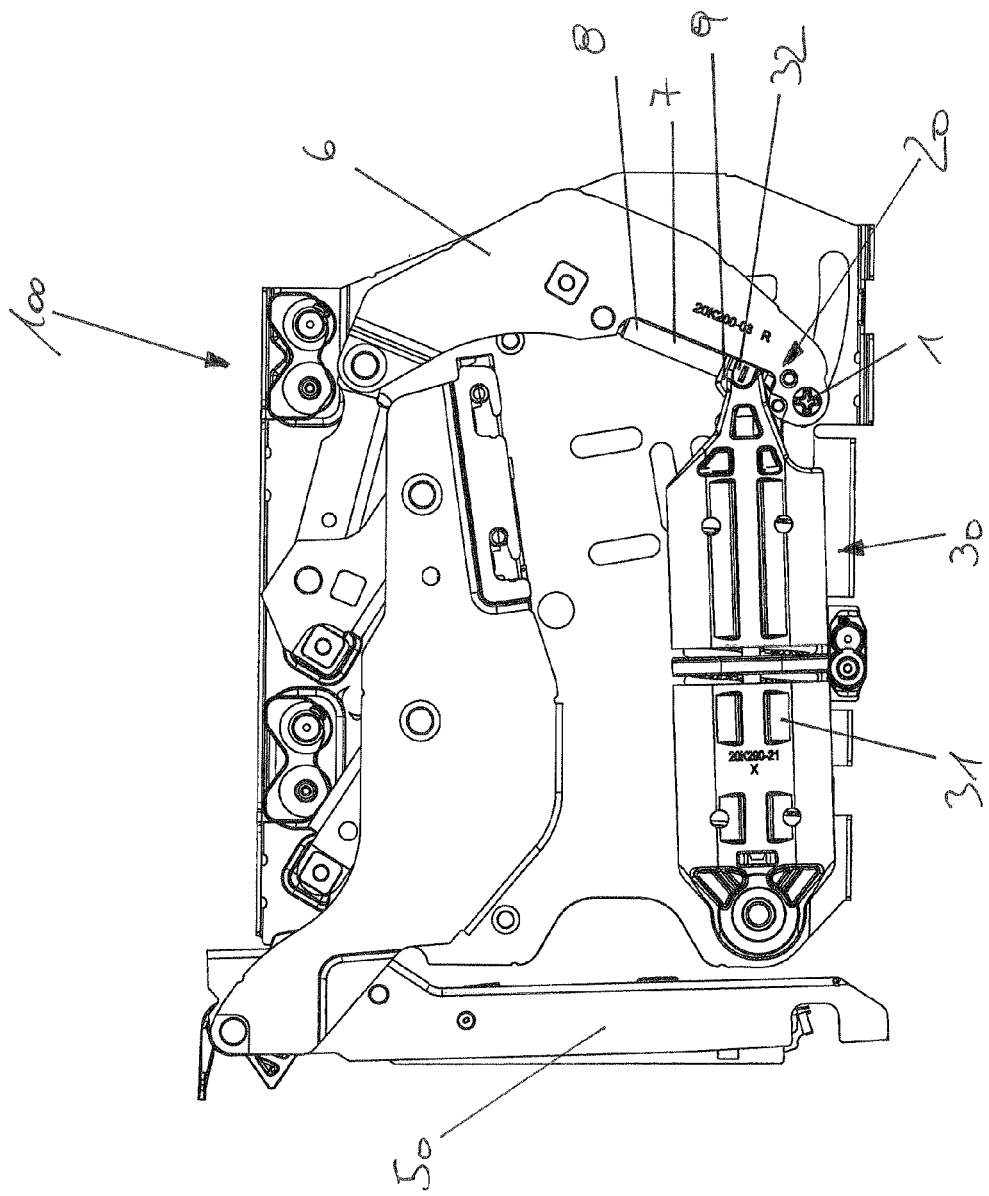
FIG. 3 shows a side view of an actuator drive.
Figure 4:
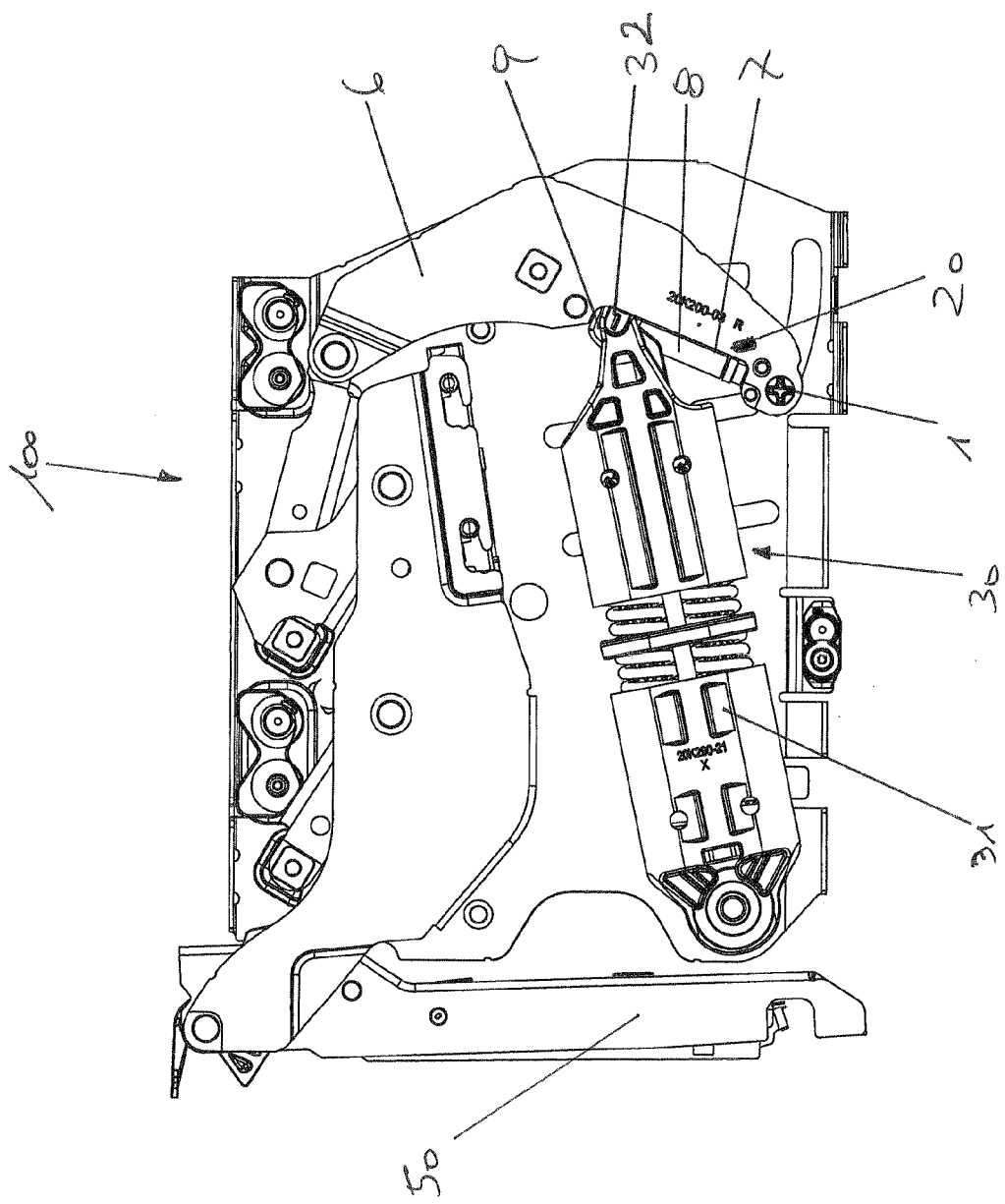
FIG. 4 shows the actuator drive of FIG. 3 with a changed position of the engagement point of the spring pack on the actuator lever.

FIGS. 3 through 6 each show a side view of an actuator drive 100. In FIGS. 3 and 4, the actuator arm 50 is pivoted in, while in FIGS. 5 and 6, the actuator arm is pivoted out.

Figure 5:
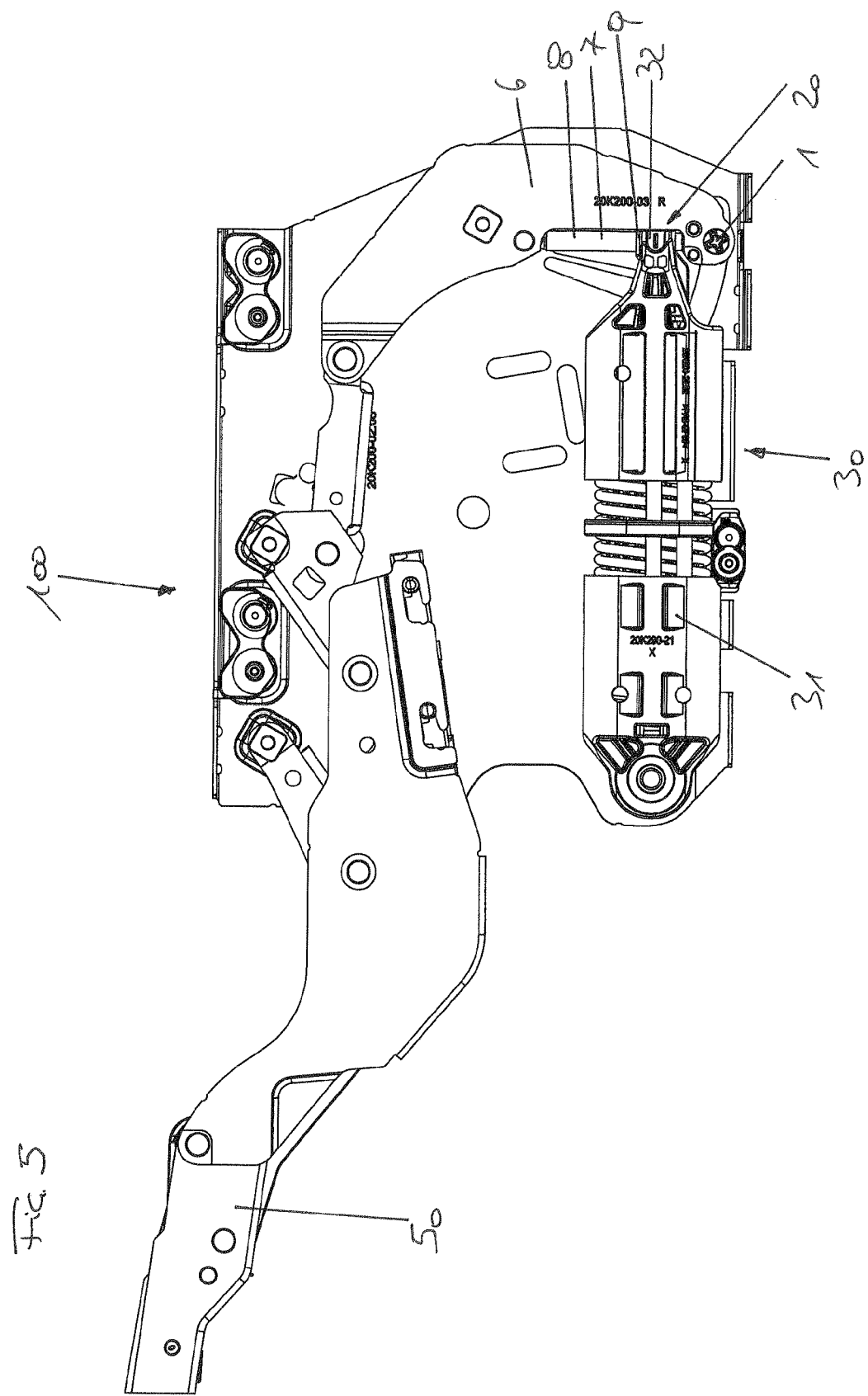
FIG. 5 shows a side view of an actuator drive with actuator arms pivoted out.
Figure 6:
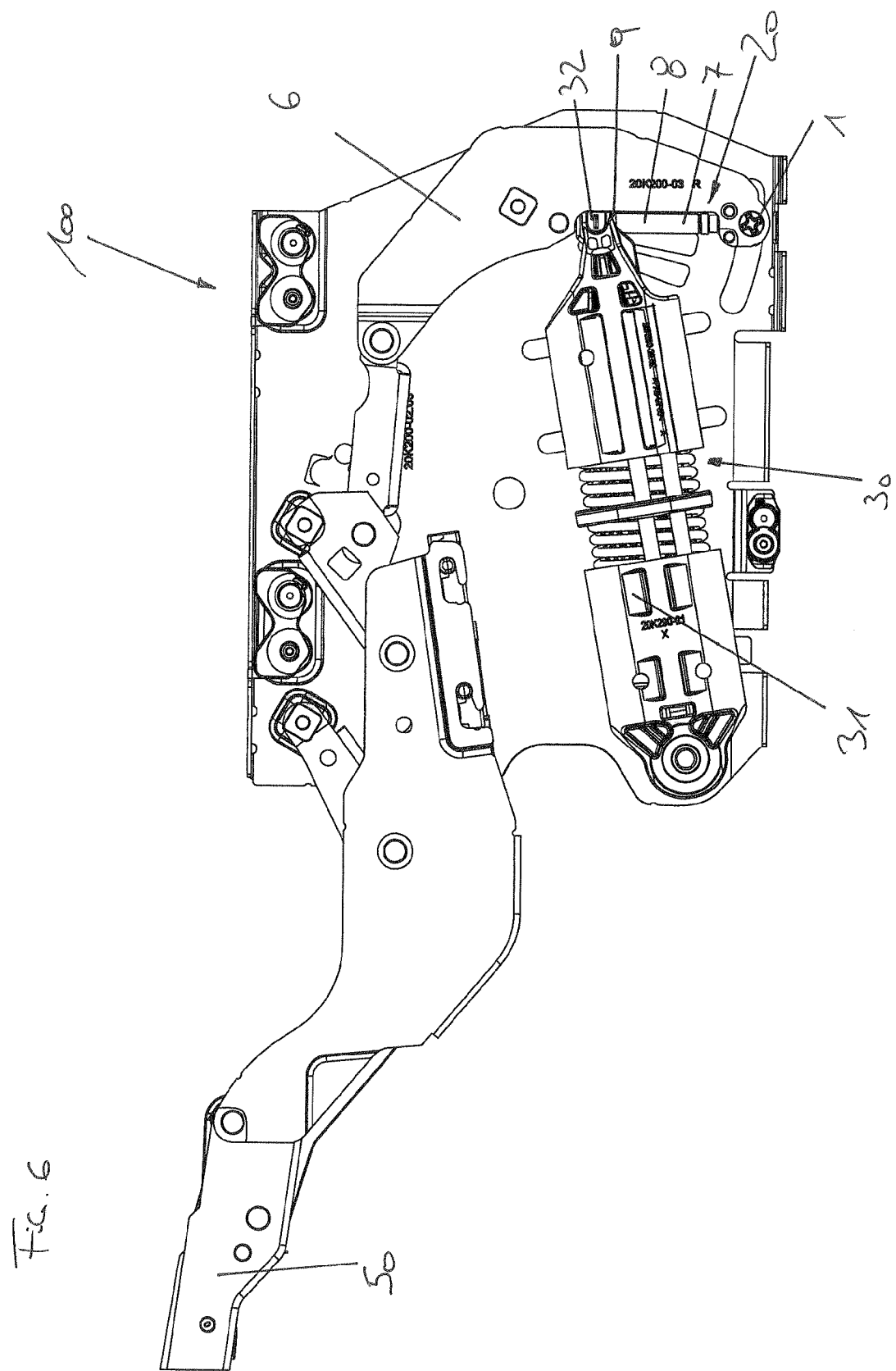
FIG. 6 shows the actuator drive of FIG. 5 with a changed engagement point of the spring pack on the pivotal lever.

The difference between FIGS. 3 and 4 and between FIGS. 5 and 6 is that, in each case, the engagement point 32 of the spring pack 31 of the spring device 30 has been adjusted by the adjusting device 20 and thus the engagement point 32 is in a lower position in FIGS. 3 and 5 and in an upper position in FIGS. 4 and 6. As a result, the operative pivotal moment of the spring device 30 acting on the actuator arm 50 is altered by way of the pivotable actuator lever 6.

In the embodiment of FIGS. 3 through 6, the adjusting device 20 serves to adjust the position of an engagement point 32 of a spring pack and 31 of the spring device 30 on the pivotable actuator lever 6.

For that purpose, the adjusting device 20 has an adjusting screw 7 which has a main body 8 with a thread provided thereon, wherein the pivotal moment of the spring device 30 acting on the actuator arm 50 is adjustable by way of the screw nut 9 which is mounted displaceably along the main body 8 by a rotary movement of the adjusting screw 7.

The rotary movement of the adjusting screw 7 is produced by rotation of one of the two pinions 1 and 2, depending on the side of the furniture carcass to which the actuator drive 100 is fixed.

Figure 7:
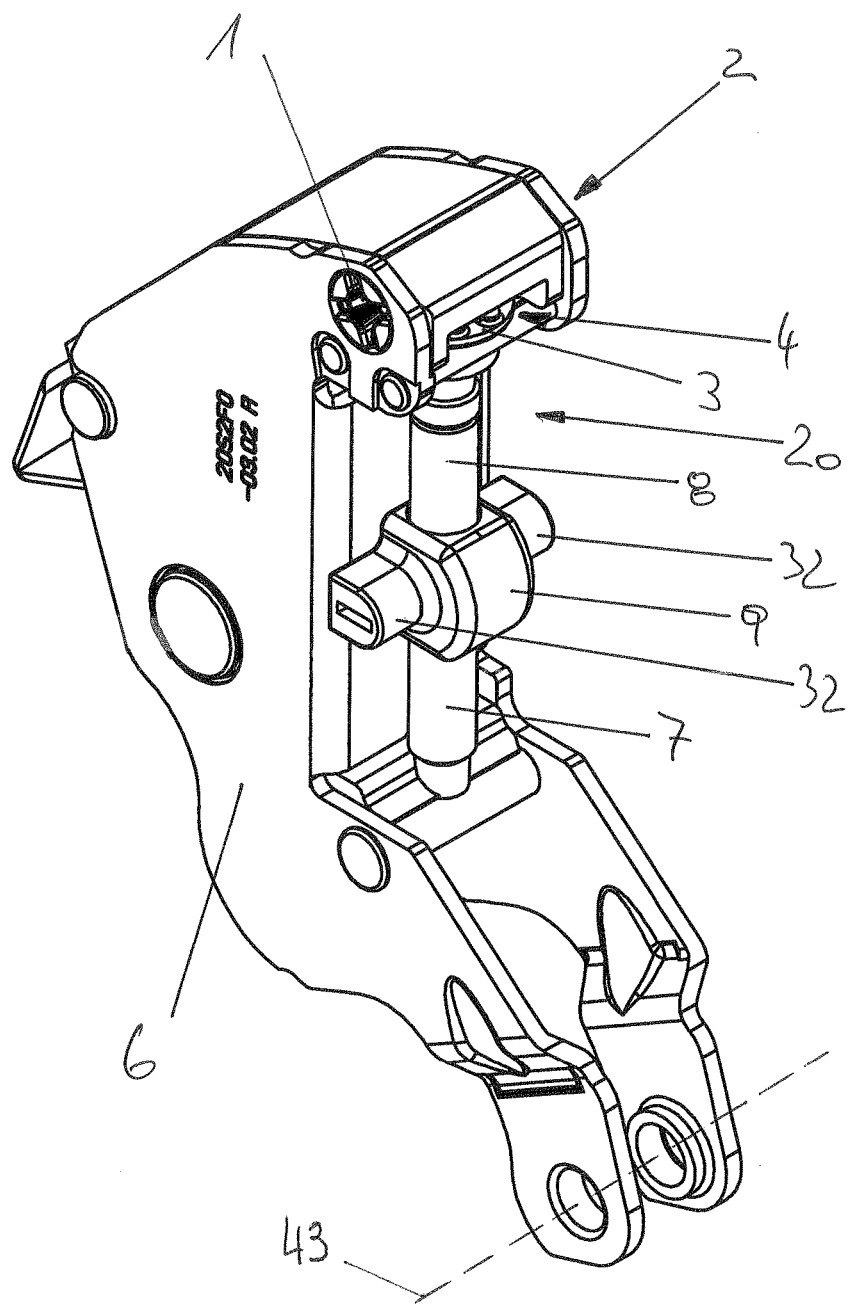
FIG. 7 shows a perspective view of the pivotal lever with an adjusting device.

FIG. 7 shows a perspective view of the adjusting device 20, showing how it is mounted to the actuator lever 6. The adjusting device 20 has an adjusting screw 7. That adjusting screw 7, in turn, has a thread on its main body 8. The screw nut 9 is displaced by way of that thread. Once again, the two engagement points 32 at which the spring device 30 (not shown) engages are provided on the screw nut 9.

Rotation of the actuator lever 6 is effected about the axis of rotation 43 of the actuator lever 6. Displacement of the screw nut 9 along the main body 8 of the adjusting screw 7 results in a change in transmission of the engagement point 32 relative to the axis of rotation 43 of the actuator lever 6.

The adjusting screw 7 is displaced by way of the gear transmission 4 (see, for example, FIGS. 9 and 10 and the description thereof).

FIG. 8 shows an exploded view of the actuator lever 6 of FIG. 7. The essential components of the actuator lever 6 in this case are the two pinions 1 and 2 which are in engagement with the crown gear 3 and thus form a gear transmission 4 (not shown, see FIGS. 9 and 10). The crown gear 3 is in the form of a screw head of the adjusting screw 7. Disposed on the adjusting screw 7 is the screw nut 9, with the two attachment points 32 thereof (for the spring pack 31 not shown here). In this arrangement, the screw nut 9 is displaced by way of a thread of the main body 8 of the adjusting screw 7.

The actuator lever 6 further has the actuator lever base 44. Provided to the left and the right of the actuator lever base 44 are the two actuator lever halves 45 and 46 which receive the adjusting device 20 (see FIGS. 9 and 10) in them.

FIG. 9 shows a perspective view of the adjusting device 20 for adjusting the actuator drive 100 (not shown here). The adjusting device 20 has a gear transmission 4 comprising a pinion 1, a pinion 2 and a crown gear 3, wherein, in this preferred embodiment, the crown gear axis 13 forms a right angle with respect to the pinion axis 11. Both pinions 1 and 2 of the gear transmission 4 are in engagement with the same crown gear 3.

It will be appreciated that the angle between the pinion axis 11 and the crown gear axis 13 does not have to be a right angle. It is also possible to envisage that angle differing from a right angle. Thus, in another embodiment, for example, it would be provided that the angle is of any value between 30° and 150°.

In this preferred embodiment, the gear transmission 4 is in the form of a bevel gear transmission 5 and both pinions 1 and 2 are disposed on a common notional axis of rotation 12 identical to the pinion axis 11.

The two pinions 1 and 2 each have a force-transmitting shaft 14 and 24, respectively, the two shafts 14 and 24 being spaced from each other.

To displace the two pinions 1 and 2, they each have a respective tool receiving means 15 and 25 for rotating the pinions 1 and 2.

In this preferred embodiment, the two tool receiving means 15 and 25 are in the form of crossed slot receiving means, it would naturally equally be possible for the two receiving means 15 and 25 to be in the form of a slot, a hexagonal socket or hexalobular socket or the like.

If, for example, the pinion 1 is rotated in the clockwise direction about the pinion axis 11, then the crown gear 3 also rotates, and therewith, the adjusting screw 7 in the clockwise direction.

If the pinion 2 is rotated in the clockwise direction, the crown gear 3 of the adjusting screw 7 is also rotated in the clockwise direction.

That is the great advantage over the state of the art. The situation in the state of the art is that, depending on the side from which the actuator drive 100 is displaced by way of the adjusting device 20, different directions of rotation have to be used to arrive at the same result. In other words, in the case of an actuator drive 100 mounted to a right-hand carcass side wall, the fitters have to rotate an actuating screw in the other direction from that in the case of an actuator drive 100 fixed to a left-hand carcass side wall in order to produce the same displacement. In other words, the fitters always have to take the mounting side into account in order to know the direction in which the actuating element has to be displaced.

That is not the case with the actuator drive 100 here. Both rotation from the right-hand side and also rotation from the left-hand side lead to the same displacement of the adjusting device 20.

FIG. 10 shows a detailed view of the gear transmission 4 which, in this preferred embodiment, is in the form of a bevel gear transmission 5.

The teeth of the gear transmission 4 are here in the form of rounded knobs 41, and in that case, engage into the corresponding recesses 42.

FIG. 10 is a rotated detailed view of FIG. 9. Otherwise, the foregoing description of FIG. 9 also applies here.

Figure 13:
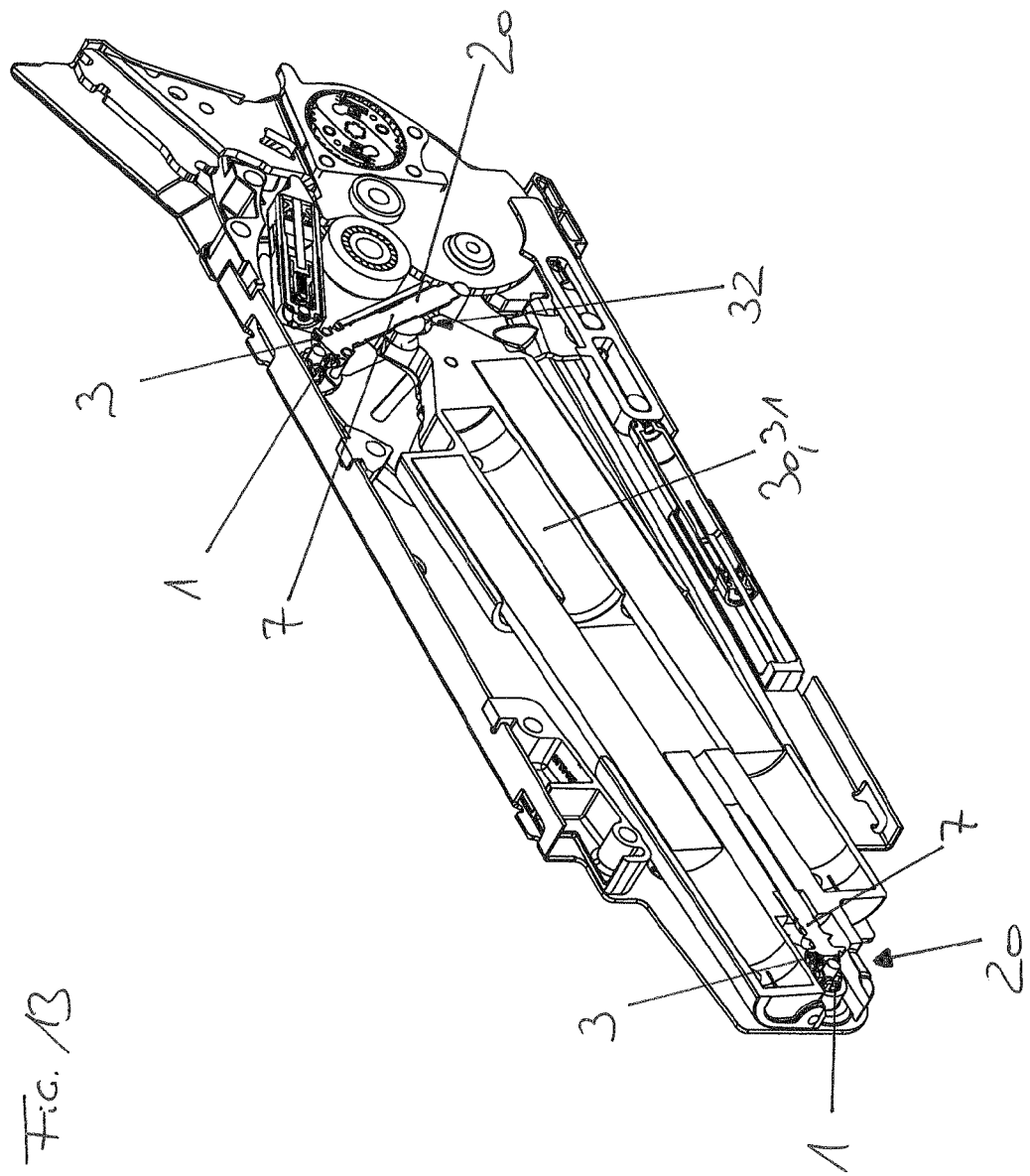
FIG. 13 shows a section through the actuator drive of FIG. 11 with two adjusting devices for adjusting the actuator drive, wherein the position of an engagement point of the spring pack on the actuator lever is altered by way of the first adjusting device and the second adjusting device adjusts the spring prestressing of the spring pack of the spring device.

FIGS. 11 through 13 show a variant of an actuator drive 100.

That actuator drive 100 has not just one adjusting device 20 but two.

In this case, one adjusting device 20 serves to adjust the position of the engagement point 32 of the spring pack 31 on the pivotable actuator lever 6. The other adjusting device 20 serves to adjust the spring prestressing of the spring pack 31 of the spring device 30.

The two adjusting devices 20 are of substantially identical structure, and displacement and adjustment of the adjusting screw 7 are again effected by way of the two pinions 1 and 2. Otherwise, the description in relation to the preceding embodiment correspondingly applies.

In both the embodiments referred to, it is preferably provided that the crown gear 3 and also the two pinions 1 and 2 are made of plastic. Naturally, they could also be made from any other material.

LIST OF REFERENCES 1 first pinion
2 second pinion
3 crown gear
4 gear transmission
5 bevel gear transmission
6 actuator lever
7 adjusting screw
8 main body of the adjusting screw
9 screw nut 11 pinion axis
12 common notional axis of rotation of the pinions 1 and 2
14 shaft of the pinion 1
15 tool receiving means of the pinion 1
20 adjusting device
24 shaft of the pinion 2
25 tool receiving means of the pinion 2
30 spring device
31 spring pack of the spring device 30
32 engagement point of the spring pack 31
41 rounded knobs of the gear transmission 4
42 rounded recesses of the gear transmission 4
43 axis of rotation of the actuator lever 6
44 actuator lever base
45 left actuator lever half
46 right actuator lever half
50 actuator arm
60 housing of the actuator drive 100
61 left housing side of the actuator drive 100
62 right housing side of the actuator drive 100
100 actuator drive
101 furniture flap
102 furniture carcass
103 left carcass side wall
104 right carcass side wall
110 article of furniture

The invention claimed is:

1. An actuator drive for moving a flap of an article of furniture, comprising:
   a pivotably mounted actuator arm for moving the flap,
   a spring device for acting on the actuator arm with a pivotal moment in an opening direction, and
   an adjusting device for adjusting the actuator drive, wherein the adjusting device has a gear transmission having a first pinion and a crown gear, and the crown gear axis forms an angle relative to the pinion axis,
   wherein the gear transmission has a second pinion which is in engagement with the same crown gear as the first pinion,
   wherein the first pinion has a tool receiving means for rotating the first pinion, and the second pinion has a tool receiving means for rotating the second pinion, and
   wherein the first pinion and the second pinion each have a force-transmitting shaft, and
   wherein the force-transmitting shaft of the first pinion and the force-transmitting shaft of the second pinion extend from the respective pinion toward each other across a center of the crown gear.

2. An actuator drive as set forth in claim 1, wherein the second pinion is on a common notional axis of rotation with the first pinion.

3. An actuator drive as set forth in claim 1, wherein the gear transmission is a bevel gear transmission.

4. An actuator drive as set forth in claim 1, wherein the force-transmitting shaft of the first pinion is spaced from the force-transmitting shaft of the second pinion.

5. An actuator drive as set forth in claim 1, wherein the tool receiving means of each of the first pinion and the second pinion is a slot or a cross slot or a hexagonal socket or a hexalobular socket.

6. An actuator drive as set forth in claim 1, wherein teeth of the gear transmission are rounded knobs which engage into recesses.

7. An actuator drive as set forth in claim 1, wherein the crown gear is of plastic or the first pinion and the second pinion are of plastic.

8. An actuator drive as set forth in claim 1, wherein the actuator drive has a housing with a substantially flat left housing side and a substantially flat right housing side, wherein:
   the first pinion is accessible from the left housing side, and
   the second pinion is accessible from the right housing side, and
   rotation of the first pinion and the second pinion from the exterior in the same direction of rotation produces the same displacement of the actuator drive.

9. An actuator drive as set forth in claim 1, wherein the adjusting device adjusts a position of an engagement point of a spring pack on a pivotable actuator lever.

10. An actuator drive as set forth in claim 1, wherein the adjusting device has an adjusting screw having a main body with a thread thereon, wherein an operative pivotal moment of the spring device acting on the actuator arm is adjustable by way of a screw nut mounted displaceably along the main body by a rotary movement of the adjusting screw.

11. An actuator drive as set forth in claim 1, wherein the adjusting device adjusts a spring prestressing of a spring pack of the spring device.

12. An article of furniture comprising a flap and two actuator drives as set forth in claim 1.

13. An actuator drive as set forth in claim 1, wherein the angle relative to the pinion axis is a right angle.

14. An actuator drive as set forth in claim 6, wherein the recesses are rounded.

15. An actuator drive as set forth in claim 7, wherein the crown gear, the first pinion and the second pinion are of plastic.

16. An actuator drive as set forth in claim 8, wherein a head of the first pinion is flush with the left housing side or a head of the second pinion is flush with the right housing side.

17. An actuator drive as set forth in claim 16, wherein the head of the first pinion is flush with the left housing side and the head of the second pinion is flush with the right housing side.

18. An actuator drive as set forth in claim 8, wherein a head of the first pinion is countersunk relatively to the left housing side or a head of the second pinion is countersunk relatively to the right housing side.

19. An actuator drive as set forth in claim 18, wherein a head the head of the first pinion is countersunk relatively to the left housing side and the head of the second pinion is countersunk relatively to the right housing side.

20. An actuator drive for moving a flap of an article of furniture, comprising:
   a pivotably mounted actuator arm for moving the flap,
   a spring device for acting on the actuator arm with a pivotal moment in an opening direction, and
   an adjusting device for adjusting the actuator drive, wherein the adjusting device has a gear transmission having a first pinion and a crown gear, and the crown gear axis forms an angle relative to the pinion axis,
   wherein the gear transmission has a second pinion which is in engagement with the same crown gear as the first pinion,
   wherein the first pinion and the second pinion each have a force-transmitting shaft, the force-transmitting shaft of the first pinion being spaced from the force-transmitting shaft of the second pinion, and wherein the force-transmitting shaft of the first pinion and the force-transmitting shaft of the second pinion extend from the respective pinion toward each other across a center of the crown gear.

* * * * *